United States Patent
Kato et al.

(10) Patent No.: US 11,424,662 B2
(45) Date of Patent: Aug. 23, 2022

(54) LINEAR MOTOR, LINEAR MOTOR DRIVEN DEVICE, AND METHOD FOR COOLING LINEAR MOTOR

(71) Applicant: FUJI CORPORATION, Chiryu (JP)

(72) Inventors: Shinichi Kato, Anjo (JP); Takeshi Nomura, Chiryu (JP)

(73) Assignee: FUJI CORPORATION, Chiryu (JP)

( * ) Notice: Subject to any disclaimer, the term of this patent is extended or adjusted under 35 U.S.C. 154(b) by 241 days.

(21) Appl. No.: 16/637,811

(22) PCT Filed: Aug. 15, 2017

(86) PCT No.: PCT/JP2017/029385
§ 371 (c)(1),
(2) Date: Feb. 10, 2020

(87) PCT Pub. No.: WO2019/035181
PCT Pub. Date: Feb. 21, 2019

(65) Prior Publication Data
US 2021/0152054 A1    May 20, 2021

(51) Int. Cl.
*H02K 9/22* (2006.01)
*H02K 41/02* (2006.01)
*H02K 41/03* (2006.01)

(52) U.S. Cl.
CPC ........... *H02K 9/227* (2021.01); *H02K 41/031* (2013.01)

(58) Field of Classification Search
CPC .......... H02K 9/227; H02K 9/225; H02K 9/22; H02K 41/031
USPC ............................................ 310/12.18, 12.29
See application file for complete search history.

(56) References Cited

U.S. PATENT DOCUMENTS

| 6,339,269 | B1 | 1/2002 | Hsiao |
| 2010/0181848 | A1* | 7/2010 | Nagasaka ............ H02K 41/03 310/12.29 |
| 2012/0268221 | A1 | 10/2012 | Czimmek et al. |

FOREIGN PATENT DOCUMENTS

| JP | 2001-327152 A | 11/2001 |
| JP | 2002044928 A * | 2/2002 |
| JP | 2012-4126 A | 1/2012 |
| JP | 2013-106497 A | 5/2013 |
| JP | 2013103497 A * | 5/2013 |
| WO | WO 2012/145085 A1 | 10/2012 |
| WO | WO 2013/145086 A1 | 10/2013 |
| WO | WO-2013145086 A1 * | 10/2013 ........... H02K 41/031 |

OTHER PUBLICATIONS

Machine translation of WO-2013145086-A1. (Year: 2013).*
(Continued)

*Primary Examiner* — Michael Andrews
(74) *Attorney, Agent, or Firm* — Oblon, McClelland, Maier & Neustadt, L.L.P.

(57) ABSTRACT

Cooling member 142 for cooling linear motor 56 includes heat collector 150 provided inside movable element 102 for absorbing the heat of the movable element and heat dissipator 152 extending from heat collector 150 to the outside of the movable element and dissipating the heat absorbed by heat collector 150, wherein heat dissipator 152 of cooling member 142 protrudes from a portion of movable element 102 on the moving body 50 side, and extends to the back side of the pair of stators 100 through a space between one of the pair of stators 100, that is, stator 100a and moving body 50.

10 Claims, 7 Drawing Sheets

(56) References Cited

OTHER PUBLICATIONS

Machine translation of JP-2013103497-A. (Year: 2013).*
Machine translation of JP-2002044928-A. (Year: 2002).*
Extended European Search Report dated Jul. 1, 2020 in Patent Application No. 17921786.4, citing documents AA and AB therein, 8 pages.
International Search Report dated Nov. 21, 2017 in PCT/JP2017/029385 filed Aug. 15, 2017, citing documents AO-AQ therein, 1 page.

* cited by examiner

LINEAR MOTOR, LINEAR MOTOR DRIVEN DEVICE, AND METHOD FOR COOLING LINEAR MOTOR

TECHNICAL FIELD

Disclosed herein is a linear motor and a linear motor driven device for moving a moving body relative to a substrate using the linear motor, and in particular, a structure and method for cooling a linear motor.

BACKGROUND ART

Patent literature 1 discloses a linear motor, a so-called T-type linear motor, which includes a pair of stators provided along a movement direction so as to face each other and a movable element provided so as to be movable between the pair of stators, and a linear motor driven device for moving a moving body with respect to a substrate using the linear motor as a drive source. Note that, such a linear motor driven device is employed in various devices such as a component mounter for mounting an electronic component on a board or a processing machine as described in patent literature 1. As described in patent literature 1 below, the linear motor is configured such that the coil is cooled because thermal deformation and thermal degradation of the component members due to heat generated by the coil are problematic.

CITATION LIST

Patent Literature

Patent literature 1: WO2012/145085A1

BRIEF SUMMARY

Problem to be Solved

However, the configuration for cooling the linear motor as described above leaves much room for improvement, and improvements can be applied to enhance the practicality of a linear motor and a linear motor driven device. In view of such circumstances, it is an object of the present disclosure to provide a highly practical method of cooling a linear motor and a highly practical linear motor and linear motor driven device using the cooling method.

Solution to Problem

A linear motor disclosed in this specification assumes a T-type linear motor as described above. In order to solve the above-mentioned problems, the present specification discloses a linear motor cooling method of dissipating heat that collects inside the movable element via a heat dissipator configured to protrude outside from the movable element to a rear side of the pair of stators. Further, the present specification discloses a linear motor including a cooling member having (A) a heat collector provided inside the movable member to absorb heat of the movable member; and (B) a heat dissipator protruding outside from the movable member extending in the direction in which the pair of stators face each other to extend to a rear side of the pair of stators.

Further, the present specification discloses a linear motor driven device including: the above linear motor; a base body on which the pair of stators are established; and a moving body movably provided with respect to the base body and fixed to the movable element in a state adjacent to the pair of stators in an establishment direction in which the stators are established, wherein the heat dissipator of the cooling member protrudes from a moving body side portion of the movable element, and extends to the back side of the pair of stators through a space between one of the pair of stators and the moving body.

Effects

According to the linear motor cooling method and the linear motor using the method of the present disclosure, since the heat dissipator extends to a rear side of one of the pair of stators, the degree of freedom of the cooling structure is increased. Further, in the linear motor driven device of the present disclosure, the heat dissipator of the cooling member protrudes from a moving body side portion of the movable element and extends to the rear side of the pair of stators through a space between one of the pair of stators and the moving body, such that, compared to a case in which the heat dissipator extends from a portion of the movable member on the opposite to the moving body side, the dimension of the portion that moves together with the moving body in the direction in which the moving body and movable member are lined up can be made smaller. In the linear motor driven device of the present disclosure, since a large thrust force is secured by the T-type linear motor while the size of a dimension in the direction in which the moving body and the movable element are lined up is curtailed, the degree of freedom of attaching to various devices is increased.

FIRST EMBODIMENT

Figure 1:
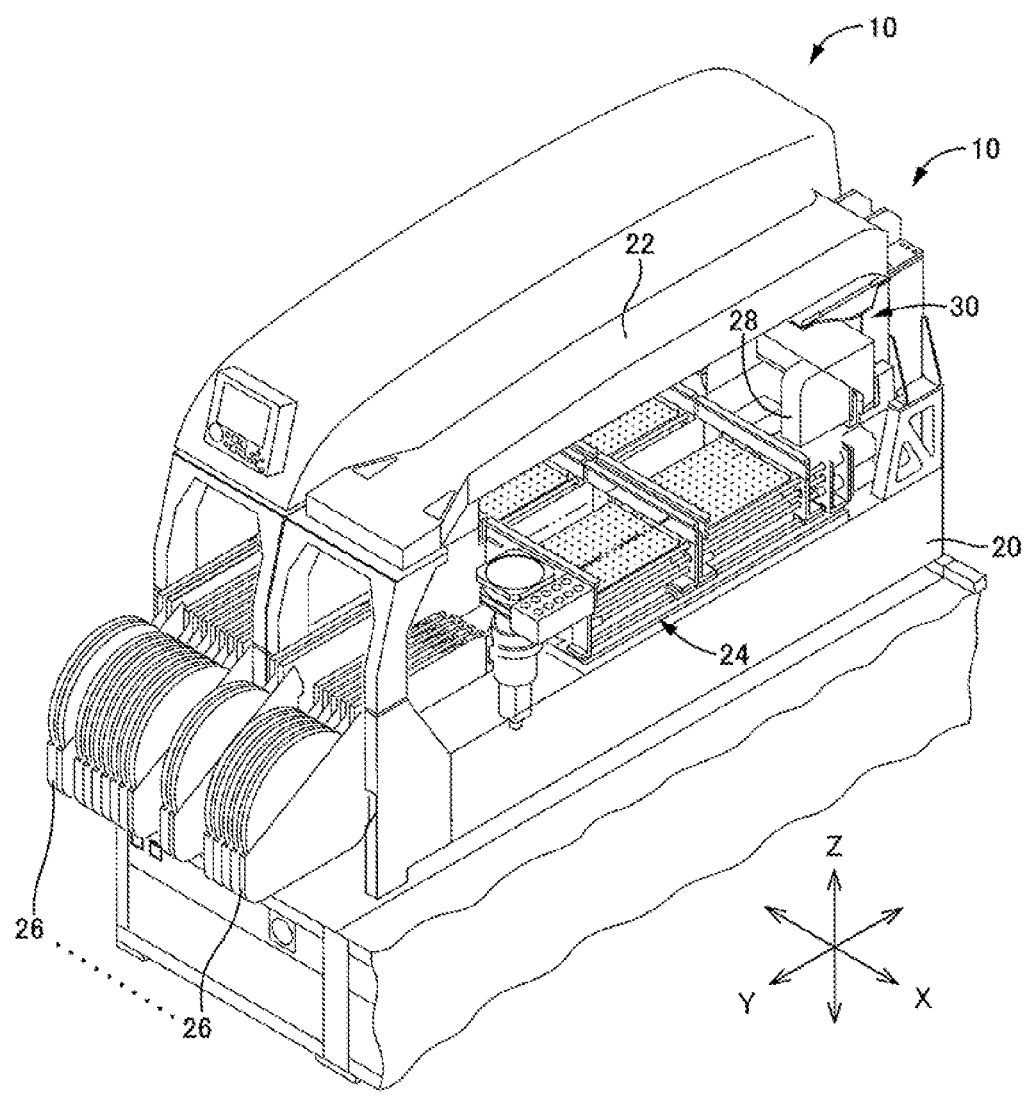
FIG. 1 is a perspective view of a component mounting device equipped with a linear motor driven device according to an embodiment of the present disclosure.
Figure 2:
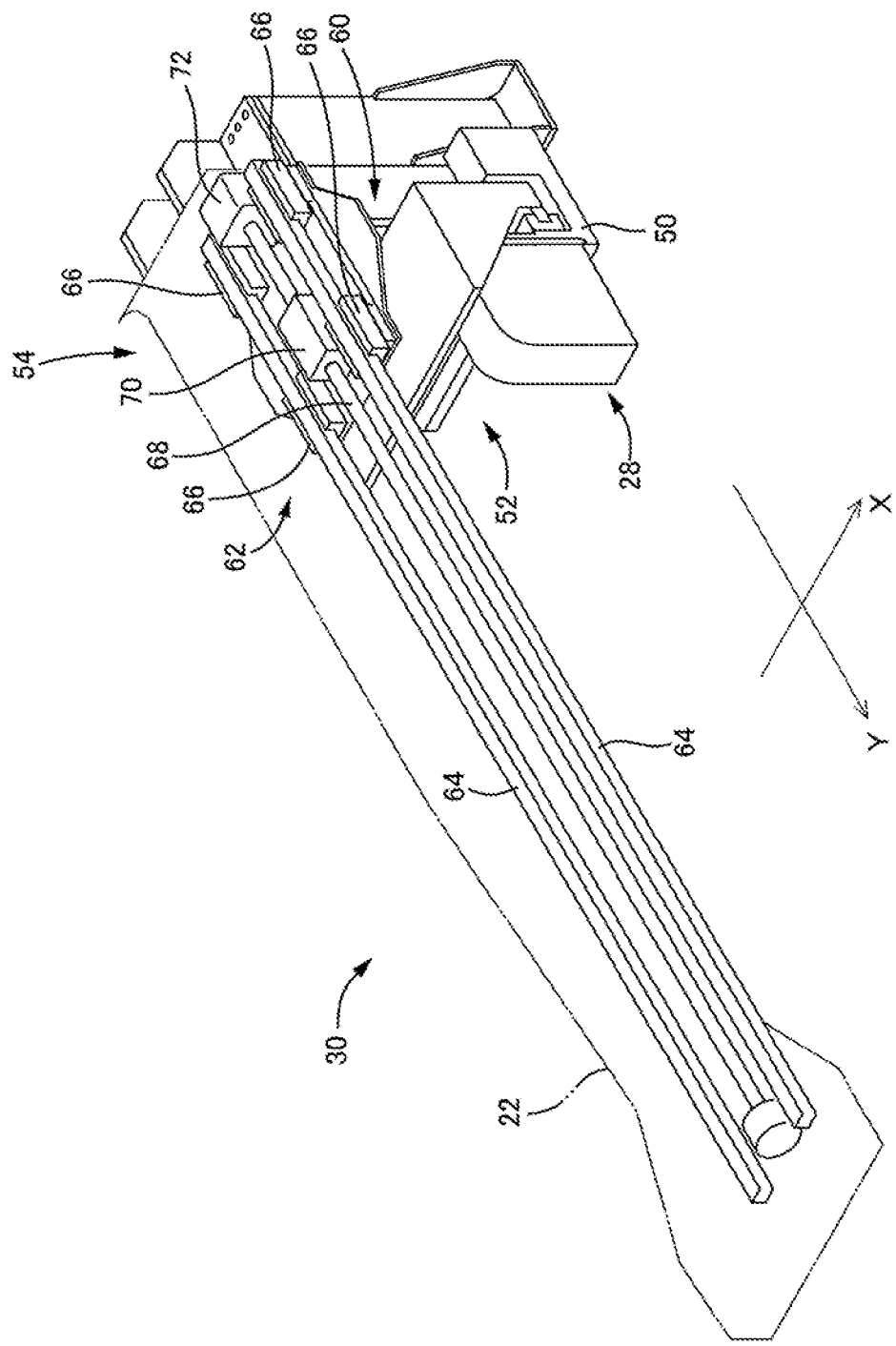
FIG. 2 is an expanded perspective view of the head moving device shown in FIG. 1 consisting of a linear motor driven device, which is an embodiment of the present disclosure.

Hereinafter, a linear motor, a linear motor driven device, and a linear motor cooling method of an embodiment will be described in detail by referring to the drawings. In addition to the embodiments below, various modifications can be made to this disclosure based on the knowledge of someone skilled in the art.

The linear motor and the linear motor driven device of the embodiment are loaded in component mounting device 10 shown in FIG. 1. Multiple component mounting devices 10 are arranged to perform work of mounting multiple types of components onto a board. In FIG. 1, two of the multiple component mounting devices 10 are shown, and one of these is shown with external panels removed. Component mounting device 10 is provided with: base 20; beam 22 provided over base 20; board conveyor device 24 arranged on the base; multiple component feeders 26 removably attached to base 20 at a front side of component mounting device 10; component mounting head 28 for picking up and holding components supplied from the multiple component feeders 26 and mounting the components on board S; and head moving device 30 provided on beam 22 and configured to move component mounting head 28. Note that, in descriptions below, a direction in which the board is conveyed by board conveyance device 24 may be referred to as a left-right direction (X direction), a direction perpendicular to the left-right direction on the horizontal plane may be referred to as a front-rear direction (Y direction), and a direction perpendicular to the left-right direction and the front-rear direction may be referred to as a vertical direction (Z direction).

Reels around which are wound component holding tapes (also referred to as "taped components", which are multiple components held in tape) are set on each of the multiple component feeders 26, and each of the multiple component feeders 26 feeds components one by one to a specified component supply position by intermittently feeding the component holding tape.

Component mounting head 28 has multiple suction nozzles 40, each of which picks up and holds a component at its lower end by the supply of negative pressure, with the suction nozzles being held by a revolver. The revolver is intermittently rotated, and the suction nozzle 40 positioned at a specified position can be raised and lowered by a nozzle raising and lowering device. When the suction nozzle 40 at the specified position is lowered, negative pressure is supplied to pick up and hold the component supplied from component feeder 26, and the supply of negative pressure is canceled to mount the component being held on a board. Note that, each of the multiple suction nozzles 70 is rotated about its own axis line, such that component mounting head 28 can change and adjust the rotational position of the components held by each suction nozzle 40.

Head moving device 30 is a so-called XY-type moving device. Head moving device 30 includes: head attachment body 50 to which component mounting head 28 is removably attached; X-direction moving device 52 to move head attachment body 50 in the X direction; and Y-direction head moving device 54 supported by beam 22 to move component mounting head 28 between component feeders 26 and the board by moving X-direction moving device 52. X-direction moving device 52 is a linear motor driven device of the present disclosure, and component mounting head 28 is moved to any position in the X-axis direction by using linear motor 56 as a drive source.

Y-direction moving device 54 includes a Y-axis slide 60 and moves Y-axis slide 60 relative to base 20 in the Y direction. Y-direction moving device 54 also includes Y-axis guide 62 that guides Y-axis slide 60 to move in the Y direction. Y-axis guide 62 includes a pair of guide rails 64 and two sliding members 66 slidably engaged with each of the pair of guide rails 64. Further, Y-direction moving device 54 includes ball screw 68 provided on beam 22 and extending in the Y-axis direction, nut 70 provided on Y-axis slide 60 in a fixed position and rotatably engaged with a ball screw, and motor (servomotor with encoder) 72 for rotating ball screw 68.

Figure 3:
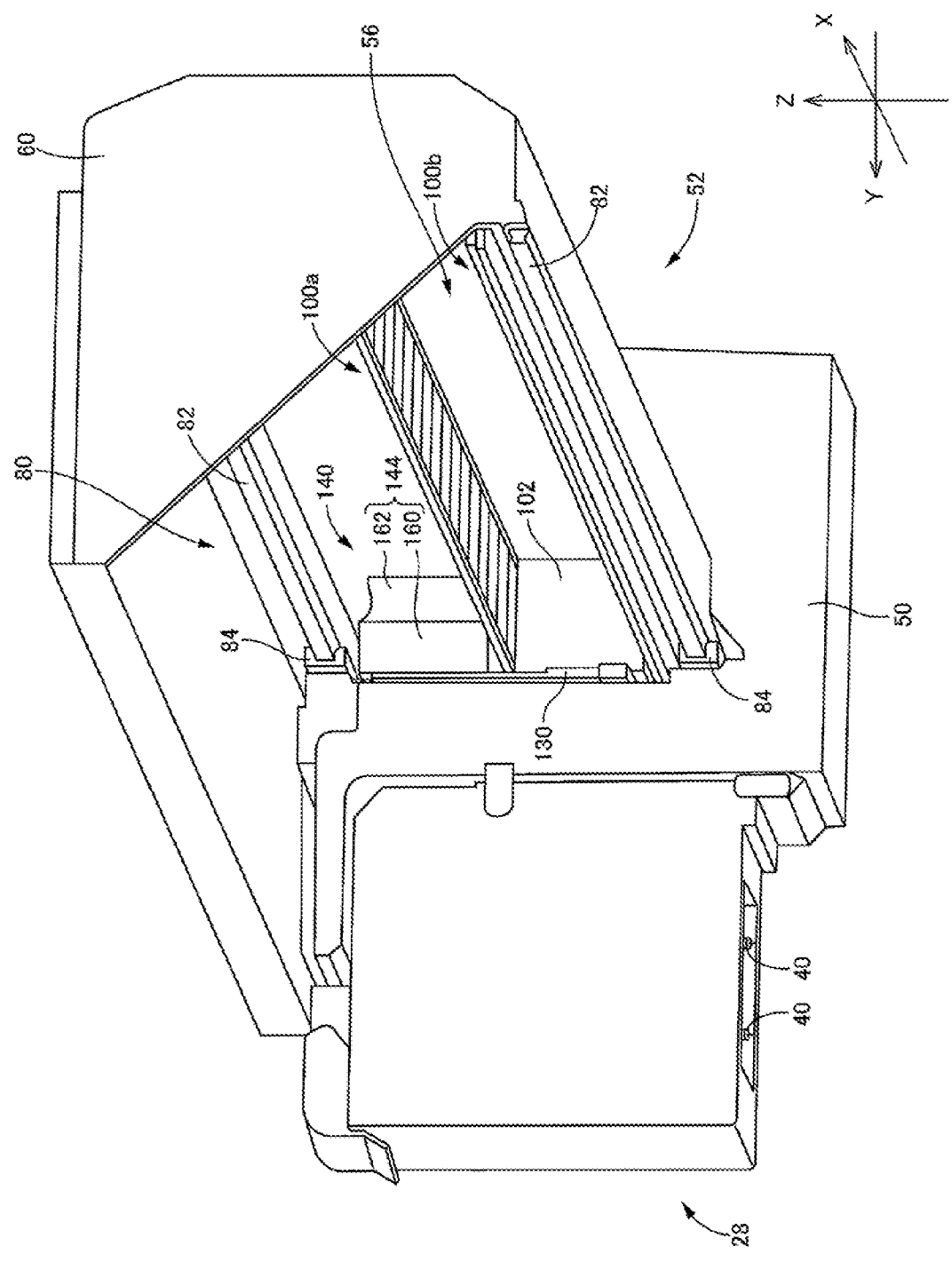
FIG. 3 is a perspective view of an X-direction moving device, which is a linear motor driven device according to an embodiment of the present disclosure.
Figure 4:
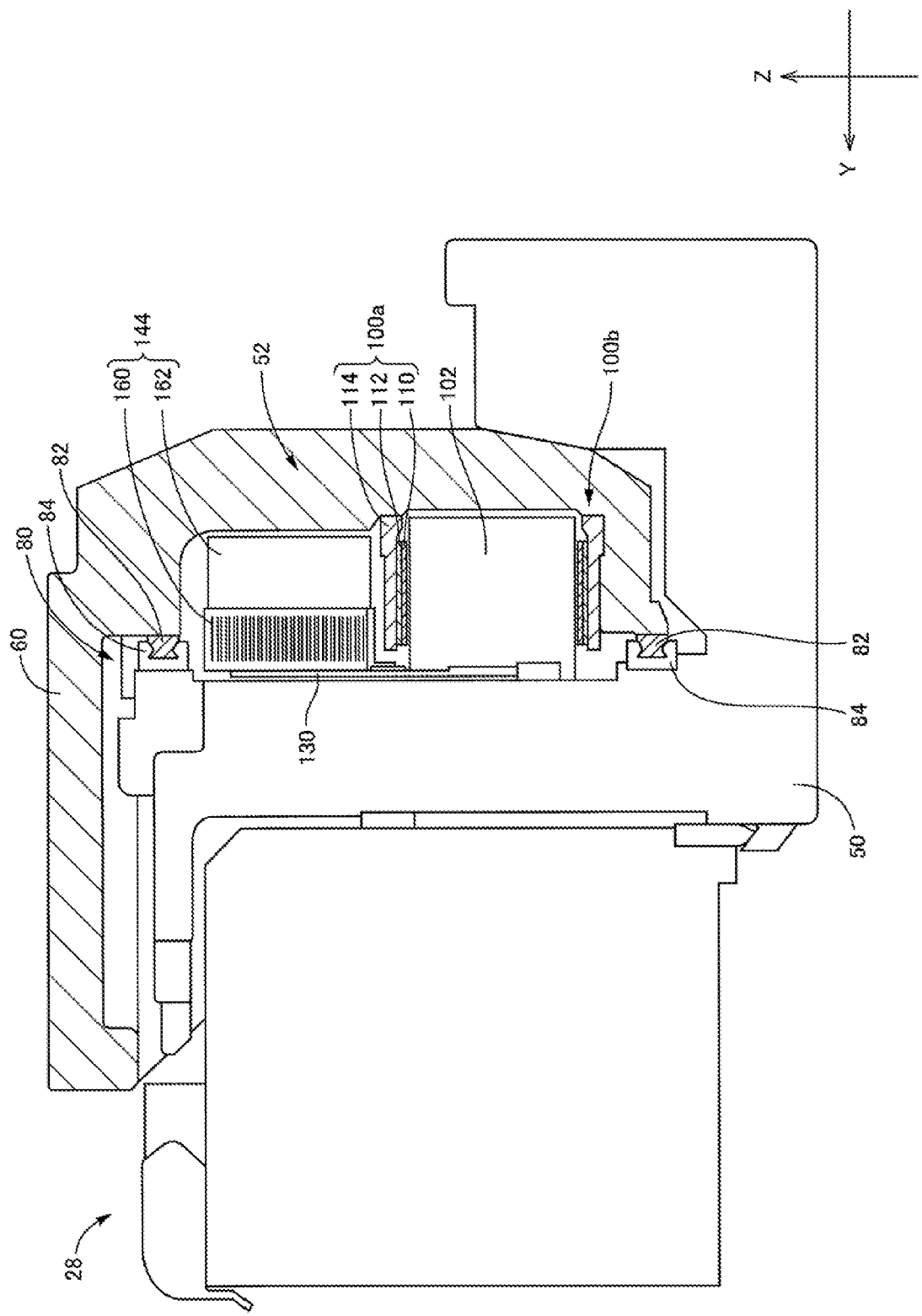
FIG. 4 is a side view of the X-direction moving device, which is a linear motor driven device according to an embodiment of the present disclosure.

Next, X-direction moving device 52 will be described in detail referring to FIGS. 3 and 4. X-direction moving device 52 moves head attachment body 50, as a moving body, by means of linear motor 56, which is a drive source, relative to Y-axis slide 60, as a base. X-direction moving device 52 includes pair of X-axis guides 80 for guiding head attachment body 50 to move in the X direction. X-axis guide 80 includes pair of guide rails 82 and pair of sliding members 84 slidably engaged with each of the pair of guide rails 82. As shown in FIG. 3, pair of guide rails 82 are fixed to the inner side surface of Y-axis slide 60 in parallel in the X direction, and pair of sliding members 84 are engaged with guide rails 82 in a state fixed to head attachment body 50. According to such a configuration, X-axis guide 80 guides head attachment body 50 to move in the X direction.

Linear motor 56 is a so-called cored T-type linear motor, and includes pair of stators 100a and 100b provided so as to face each other with a space therebetween, and movable element 102 moved between the pair of stators 100a and 100b. Each of the pair of stators 100a and 100b includes multiple permanent magnets 110, yoke 112 that is a magnetic material to which permanent magnets 110 are fixed, and base plate 114 which is a non-magnetic material for holding yoke 112. Further, pair of stators 100a and 100b extend in the X-axis direction, and are established on the inner side surface of Y-axis slide 60 so as to face each other with a space therebetween in the vertical direction. Note that, multiple permanent magnets 110 are alternately arranged in the X direction so that magnetic poles are different from each other on a front surface of each of the pair of stators 100a and 100b, the front surfaces being the surfaces that face other. Also, opposite permanent magnets 110 have magnetic poles different from each other.

Figure 5:
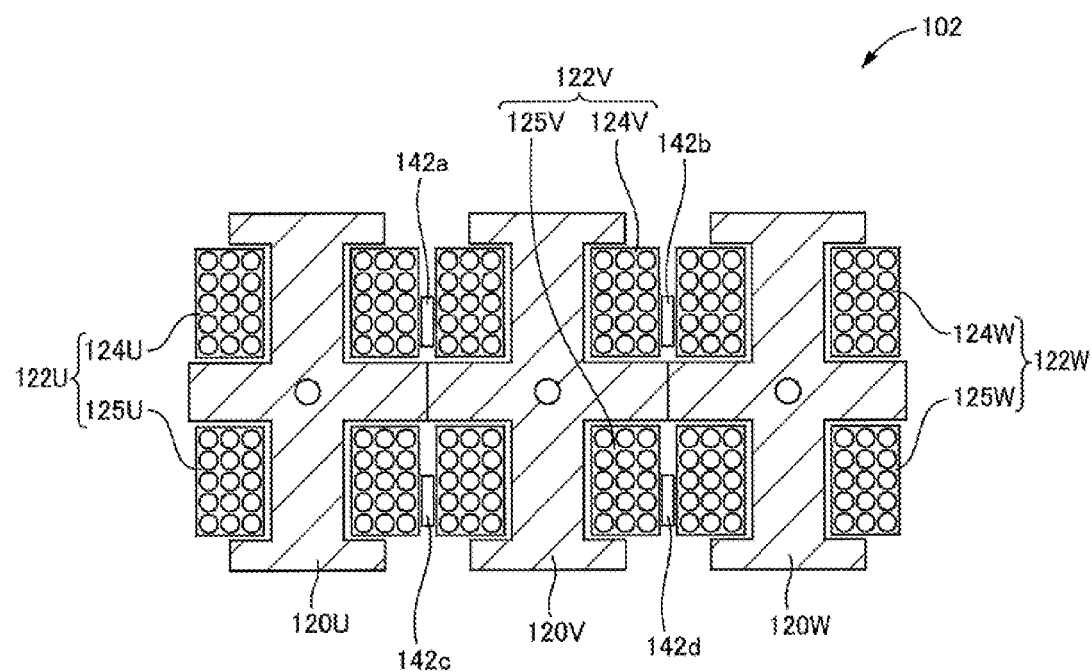
FIG. 5 is a cross section view of the movable element of the linear motor from the front side.
Figure 5:
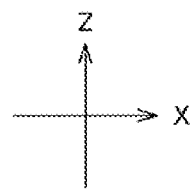

On the other hand, as shown in the cross sectional view of FIG. 5, movable element 102 includes cores 120U, 120V, and 120W corresponding to three phases of a U-phase, a V-phase, and a W-phase, and coils 122U, 122V, and 122W wound around cores 120U, 120V, and 120W, respectively. The three-phase cores 120U, 120V, and 120W and coils 122U, 122V, and 122W are arranged side by side in the X-axis direction, which is the movement direction of movable element 102. Note that, the three-phase cores 120U, 120V, and 120W have a cross-shaped cross-sectional shape, and in each of the three-phase coils 122U, 122V, and 122W, the portions wound on the upper side of the cores 120U, 120V, and 120W are referred to as upper portions 124U, 124V, and 124W, and the portions wound on the lower side are referred to as lower portions 125U, 125V, and 125W.

Movable element 102 is positioned rearward of the vertical direction extending portion of head attachment body 50 as a moving body, and movable element 102 and head attachment body 50 are fixed via attachment plate 130. In other words, attachment plate 130 is provided so as to be parallel to the XZ plane, and head attachment body 50 is fixed to the front side of attachment plate 130, and movable element 102 is fixed to the rear side of attachment plate 130, thereby fixing movable element 102 and head attachment bodying body 50. That is, movable element 102 and head attachment body 50 are fixed to be adjacent each other in the establishment direction (Y axis direction, front-rear direction) of the pair of stators 100.

Figure 6:
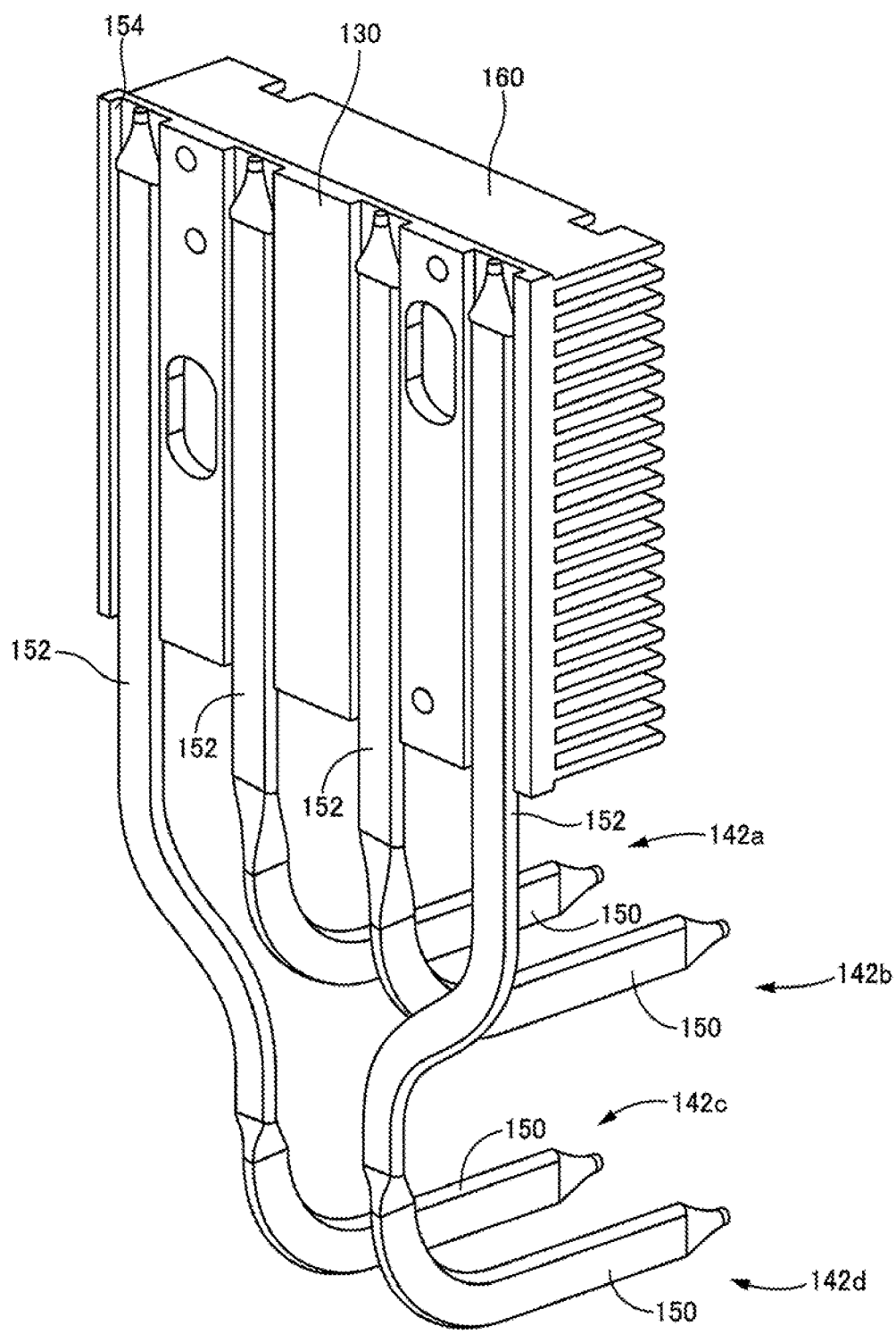
FIG. 6 is an enlarged perspective view of the cooling mechanism shown in FIGS. 3 and 4.
Figure 7:
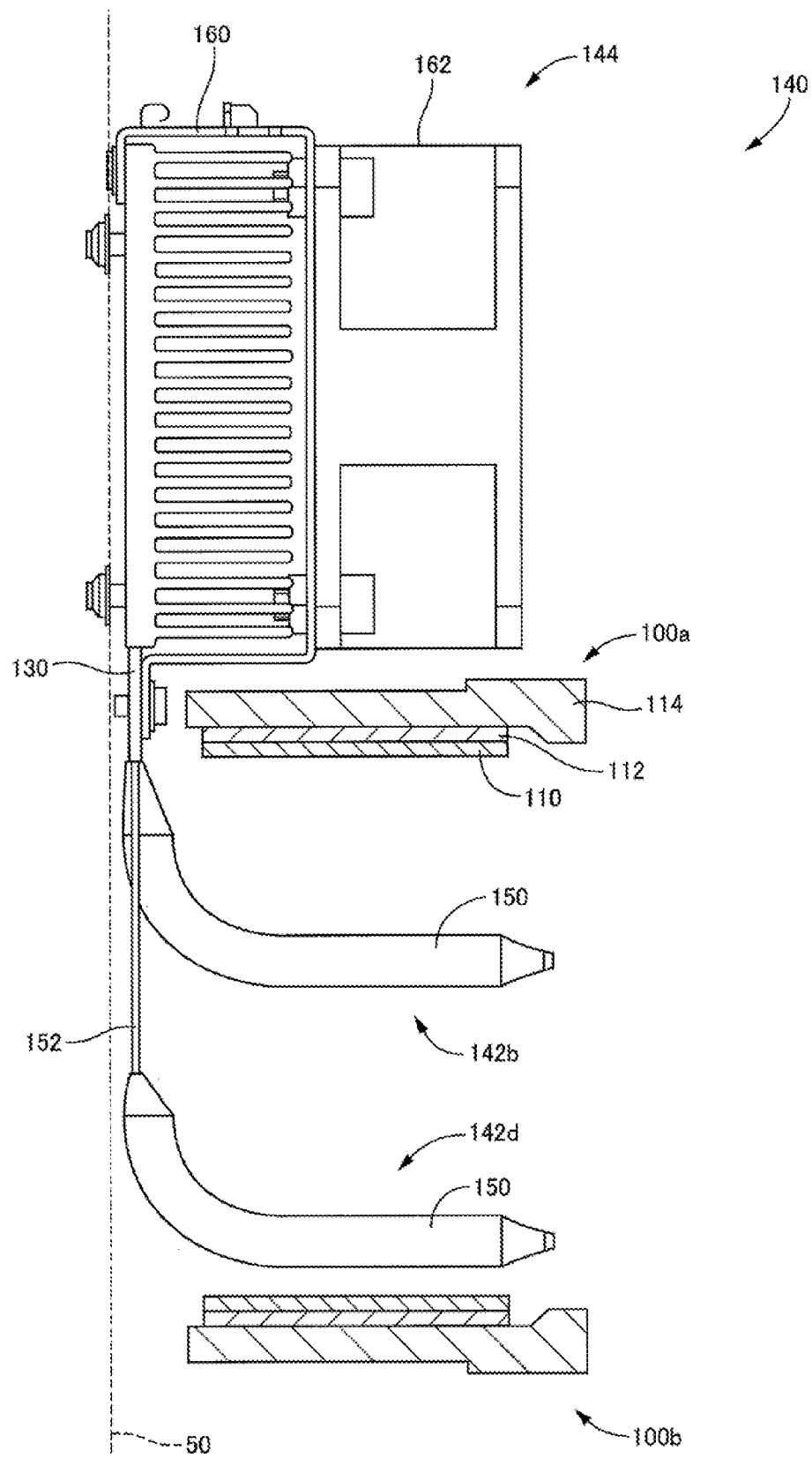
FIG. 7 is an enlarged side view of the cooling mechanism shown in FIGS. 3 and 4.

Further, X-direction moving device 52 includes cooling device 140 for cooling linear motor 56. Cooling mechanism 140 includes four heat pipes 142 and heat sink 144 for cooling the heat collected by heat pipes 142. Hereinafter, cooling mechanism 140 will be described in detail with reference to FIGS. 6 and 7 in addition to FIG. 5.

Each of the four heat pipes 142*a*, 142*b*, 142*c*, 142*d* is inserted, with one end thereof extending in the Y axis direction, between upper portion 124U of U-phase coil 122U and upper portion 124V of V-phase coil 122V, between upper portion 124V of V-phase coil 122V and upper portion 124W of W-phase coil 122W, between lower portion 125U of U-phase coil 122U and lower portion 125V of V-phase coil 122V, and between lower portion 125V of V-phase coil 122V and lower portion 125W of W-phase coil 122W. The one end of each of the four heat pipes 142 functions as a heat collector for absorbing the heat of coil 122. Hereinafter, the one end of the four heat pipes 142 is sometimes referred to as heat collector 150.

Heat collectors 150 of the four heat pipes 142 have a flat shape. In other words, the cross-sectional shape of heat collector 150 extending in the Y-axis direction is such that the dimension in the movement direction (X-axis direction) is smaller than the dimension in the direction perpendicular to the movement direction (Z direction). Accordingly, in X-direction moving device 52, which is the linear motor driven device of the present embodiment, even if heat collector 150 of heat pipes 142 is inserted between coils 122 of the respective phases in a state in direct contact with coils 122 so as to efficiently absorb heat, the size of the dimension in the movement direction of movable element 102 is curtailed.

On the other hand, heat dissipator 152, which is the other end portion of each of the four heat pipes 132, protrudes from the head moving body 50 side (front side) portion of movable element 102, passes between stator 100*a* on the upper side and head attachment member 50, and extends above stator 100*a*. In other words, attachment plate 130 is formed with four vertically extending groove plates 154, and heat dissipators 152 of the four heat pipes 132 extend upward along groove 154 of attachment plate 130.

Heat dissipators 152 of the four heat pipes 142 also have a flat shape. In other words, the cross-sectional shape of heat dissipator 152 is such that the dimension extending in the establishment direction (Y-axis direction) of the pair of stators 100 is smaller than the dimension in the direction (X-direction) perpendicular to that the direction. To put it another way, the cross-sectional shape of heat dissipator 152 extending in the Z-axis direction is such that the dimension (Y direction) perpendicular to the movement direction (X-direction) is smaller than the dimension in the movement direction. That is, X-direction moving device 52 that is the linear motor driven device of the present embodiment is configured such that, even if four heat pipes 142 pass between the pair of stators 100 and head attachment body 50, the gap between the pair of stators 100 and head attachment body 50 is small, and the size of the dimension in the Y-axis direction including movable element 102 and head attachment body 50 is curtailed. As described above, each of the four heat pipes 142 has a shape in which the directions of the flat surfaces of heat collector 150 and heat dissipator 152 are different from each other.

Note that, attachment plate 130 is made of aluminum having relatively high thermal conductivity, and receives heat from heat dissipators 152 of the four heat pipes 142 in contact with the attachment plate 130 so as to dissipate heat. Further, heat sink 144 is provided at an upper end of attachment plate 130. More specifically, heat sink 144 includes fins 160 having multiple projections formed thereon, and fan 162 that air-cools fins 160, and fins 160 are fixed to the rear side of the upper end of attachment plate 130, and fan 162 is fixed to the rear side of fins 160. That is, fan 162, which is a cooling device, is fixed to movable element 102 via attachment plate 130 in a state in which fan 162 is positioned on the upper of the pair of stators 100, stator 100*a*, that is, in a state on the upper side of upper stator 100*a*.

In a cored T-type linear motor, it is common for the cooling mechanism to be arranged side-by-side with respect to the movable member in the establishment direction of the stator. In linear motor 56 of the present embodiment, if the cooling mechanism is provided behind movable element 102 in the Y-axis direction, the size of the cooling mechanism in the Y-axis direction including movable element 102 and head attachment body 50 increases. On the other hand, with X-direction moving device 52, which is the linear motor driven device of the present embodiment, heat dissipator 152 of heat pipe 142, which is a cooling member, protrudes from the head moving body 50 side (front side) of movable element 102, passes between stator 100*a* on the upper side and head attachment body 50, and extends to the rear side of stator 100*a*, such that the size of the dimension in the Y-axis direction including movable element 102 and head attachment body 50 can be curtailed.

Also, with X-direction moving device 52, which is the linear motor driven device of the present embodiment, since heat sink 144 including the cooling device is provided by using the space on the rear surface of one of the pair of stators, stator 100*a*, the effect of cooling linear motor 56 is enhanced while curtailing the size of the dimension in the Y-axis direction including movable element 102 and head attachment body 50. Note that, although fan 162 cannot be used in a magnetic field because a Hall sensor is used, in X-direction moving device 52 which is the linear motor driven device of the present embodiment, since yoke 112 is disposed between multiple permanent magnets 110 and fan 162, fan 162 is not affected by the multiple permanent magnets 110, and malfunction or the like of fan 162 is prevented.

Also note with the linear motor driven device of the present embodiment, the linear motor is oriented sideways, in other words, the establishment direction of the pair of stators is oriented sideways, but the establishment direction of the pair of stators may of course be a vertical direction.

REFERENCE SIGNS LIST

10: component mounting device;
28: component mounting head;
30: head moving device;
50: head attachment body (moving body);
52: X-direction moving device (linear motor driven device);
54: Y-direction moving device;
56: linear motor;
60: Y-axis slide (base); 100*a*, 100*b*: stator;
102: movable element;
110: permanent magnet;
112: yoke;
120U, 120V, 120W: core;
122U, 122V, 122W: coil;
130: attachment plate;
140: cooling mechanism;
142: heat pipe (cooling member);
144: heat sink;
150: heat collector;
152: heat dissipator;
160: fin;
162: fan (cooling device)

The invention claimed is:

1. A linear motor comprising:
a pair of stators provided along a movement direction so as to face each other, the movement direction being parallel to an X direction;
a movable element configured to move between the pair of stators; and
a cooling member including (A) a heat collector provided inside the movable member to absorb heat of the movable member, the heat collector extending substantially in a Y direction perpendicular to the X direction; and (B) a heat dissipator protruding outside from the movable member and extending substantially in a Z direction in which the pair of stators face each other to extend to a rear side of the pair of stators, wherein
the heat collector has a first thickness in the X direction that is less than a second thickness in the Z direction, and
the heat dissipater has a third thickness in Y direction that is less than a fourth thickness in the X direction.

2. The linear motor according to claim 1, further comprising:
a cooling device configured to cool the heat dissipator of the cooling member, and the cooling device is fixed to the movable element while being positioned on the rear side of one of the pair of stators.

3. The linear motor according to claim 2, further comprising:
a fin formed with multiple protrusions and connected to the heat dissipator of the cooling member, wherein
the cooling device is a fan configured to cool the heat dissipator of the cooling member by air-cooling the fin.

4. The linear motor according to claim 3, wherein
each of the pair of stators includes a yoke and multiple permanent magnets fixed to the yoke, and
the fin is provided on a rear surface of the yoke.

5. The linear motor according to claim 1, wherein
the cooling member is configured such that one end of the cooling member is inserted inside the movable member and functions as the heat collector, and another end of the cooling member protrudes outside of the movable member and is a heat pipe functioning as the heat dissipator.

6. The linear motor according to claim 5, wherein
the linear motor is configured to operate by three-phase alternating current having three phases of a U phase, a V phase, and a W phase, and the movable element is configured to include multiple coils corresponding to the U phase, the V phase, and the W phase, and the end that is the heat pipe is interposed between the coils of each phase.

7. The linear motor according to claim 6, wherein
the coils of the U phase, the V phase, and the W phase are lined up in the movement direction, and the end that is the heat pipe extends parallel to the pair of stators, and has a cross section shape in which a dimension in the movement direction is smaller than a dimension in a direction perpendicular to the movement direction.

8. A linear motor driven device comprising:
a linear motor according to claim 1;
a base body on which the pair of stators are established; and
a moving body movably provided with respect to the base body and fixed to the movable element in a state adjacent to the pair of stators in an establishment direction in which the stators are established, wherein
the heat dissipator of the cooling member protrudes from a moving body side portion of the movable element, and extends to the rear side of the pair of stators through a space between one of the pair of stators and the moving body.

9. The linear motor driven device according to claim 8, wherein
the pair of stators are established separated from each other in the Z direction,
the heat dissipator of the cooling member extends upwards, and
the linear motor is provided with a cooling device fixed to the movable element in a state positioned above a higher one of the pair of stators, and configured to cool the heat dissipator of the cooling member.

10. The linear motor according to claim 1, wherein
the heat collector and the heat dissipater are each flat heat pipes in which the directions of respective flat surfaces are different from each other.

* * * * *